United States Patent [19]
Dreier

[11] 3,797,545
[45] Mar. 19, 1974

[54] BLADE HOLDER
[75] Inventor: Raymond C. Dreier, Chicago, Ill.
[73] Assignee: Dreier Brothers Inc., Chicago, Ill.
[22] Filed: Mar. 15, 1973
[21] Appl. No.: 341,365

Related U.S. Application Data
[62] Division of Ser. No. 228,224, Feb. 22, 1972.

[52] U.S. Cl............................. 145/33 A, 145/35 E
[51] Int. Cl............................................ B27b 21/02
[58] Field of Search.......... 30/339; 145/33 R, 33 A, 145/33 AB, 31 R, 32 R, 34 R, 34 A, 35 E, 108 R

[56] References Cited
UNITED STATES PATENTS
650,913   6/1900   Saxton............................. 145/35 E FOREIGN PATENTS OR APPLICATIONS
632,012   11/1949   Great Britain................... 145/33 A

*Primary Examiner*—James L. Jones, Jr.
*Assistant Examiner*—Mark S. Bicks
*Attorney, Agent, or Firm*—Prangley, Dithmar, Vogel, Sandler & Stotland

[57] ABSTRACT

A blade holder for a handsaw construction for holding a saw blade having an aperture in one end thereof, the handsaw construction including a longitudinally extending saw frame having a handle at the rear end thereof and a front leg at the front end thereof and a rear leg intermediate the front leg and the handle, tensioning means on at least one of the legs for securing thereto the other end of the saw blade and a blade holder on the other of the legs for securing thereto the one end of the saw blade, the blade holder including a first clamping member engaged by the other leg and having a first clamping surface with an elongated opening therein, the first clamping surface supporting the saw blade thereagainst with the aperture therein overlying the opening, a second clamping member shiftably mounted on the first clamping member and having a second clamping surface for cooperation with the first clamping surface to hold the saw blade therebetween with a finger on the second clamping surface extending therefrom, movement of the finger toward the one leg camming the first and the second clamping surfaces toward each other and against the associated saw blade, the second clamping member being movable between a saw blade receiving position and a saw blade clamping position, operation of the tensioning means to tension the saw blade moves the finger and cams the clamping members to the clamping positions thereof with the saw blade clamped therebetween. The second clamping member may be mounted on the first clamping member for pivotal or shiftable movement with respect thereto.

4 Claims, 12 Drawing Figures

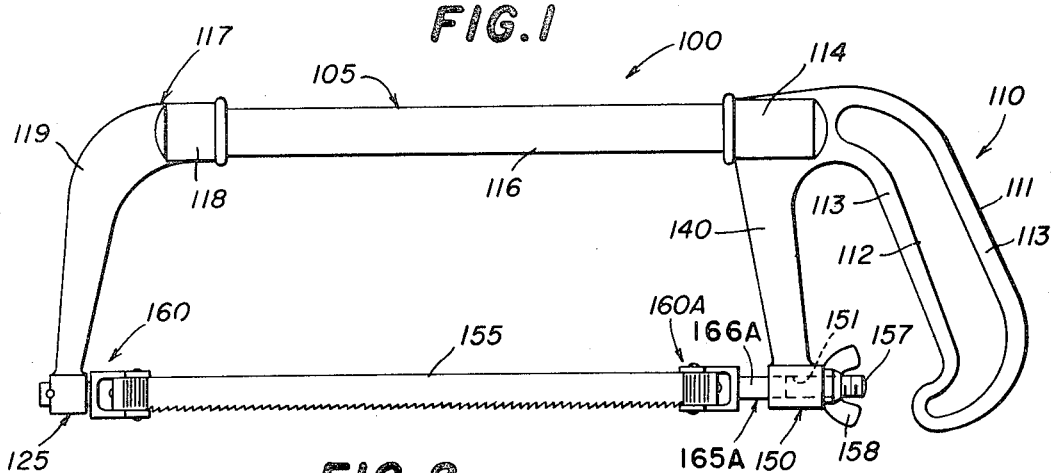
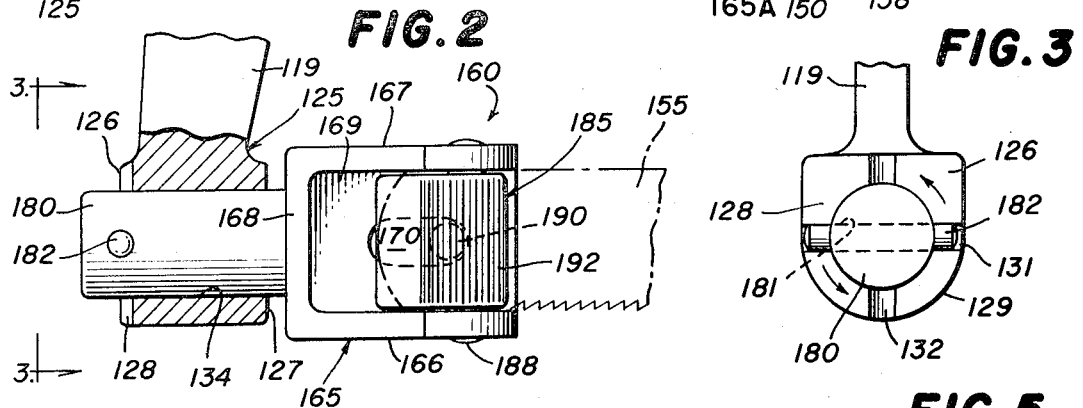
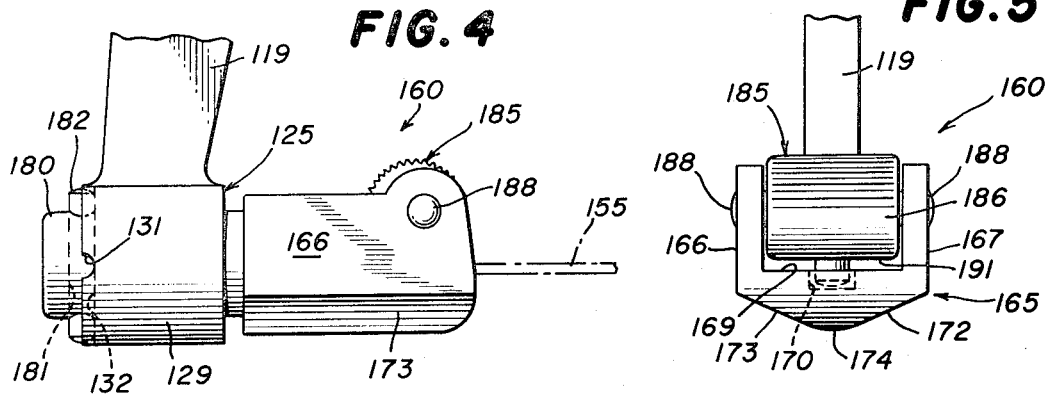
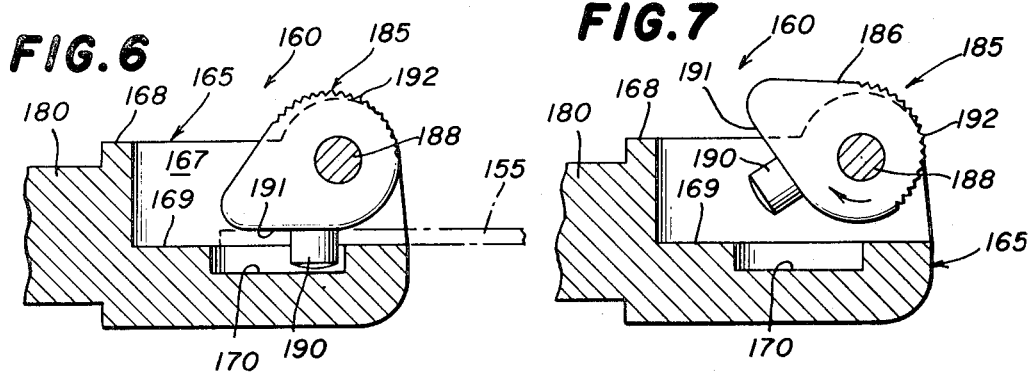

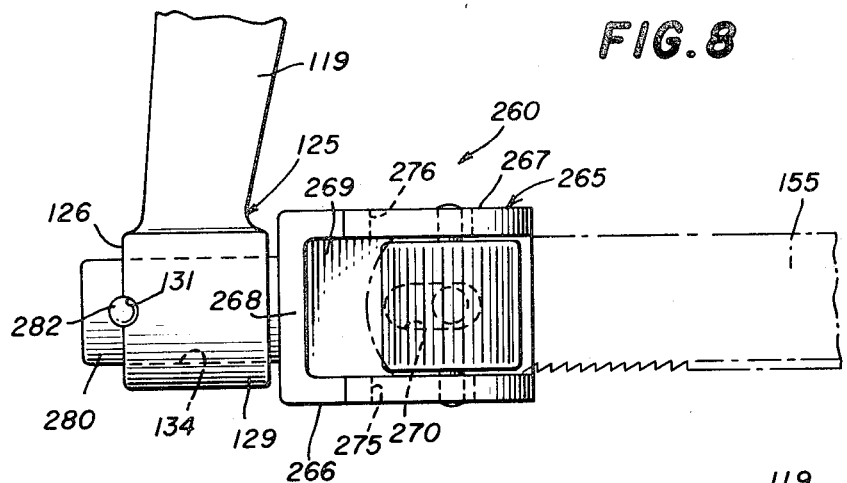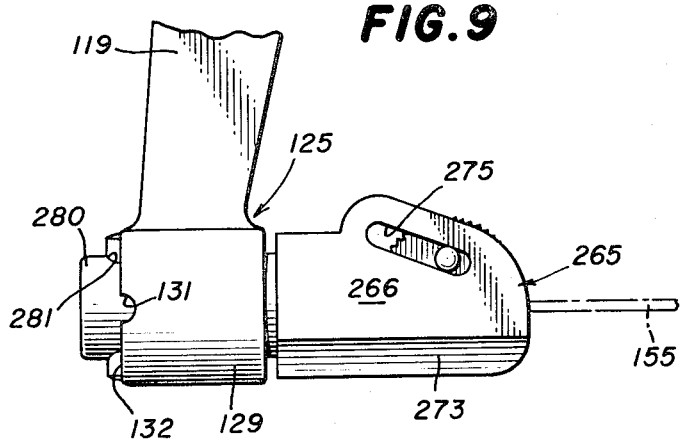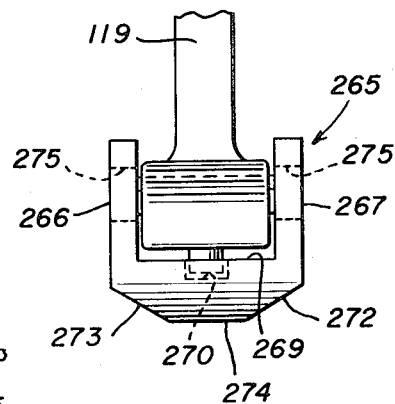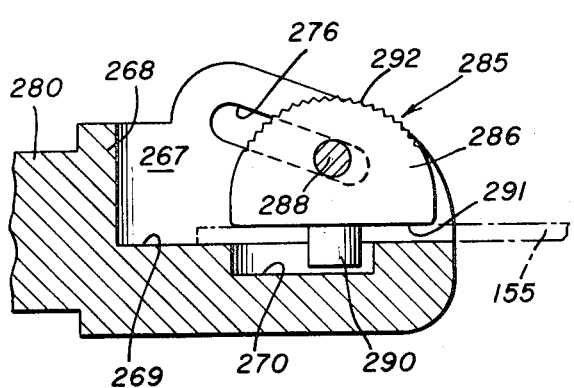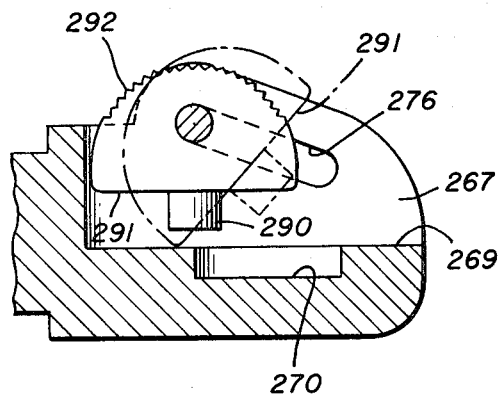

BLADE HOLDER

This is a division of application Ser. No. 228,224 filed Feb. 22, 1972.

This invention is directed to an improved handsaw construction in which a novel blade holder is provided, and more specifically to a handsaw construction having a blade holder including first and second clamping members having first and second clamping surfaces respectively, the first and second clamping members being operable firmly to clamp a saw blade therebetween.

It is an important object of this invention to provide a handsaw for holding a saw blade having an aperture in one end thereof, the handsaw comprising a longitudinally extending saw frame including a handle at the rear end thereof and a front leg at the front end thereof, and a rear leg intermediate the front leg and the handle, tensioning means on the rear leg for securing thereto the rear end of a saw blade and a blade holder on the other of the legs for securing thereto the one end of the saw blade, the blade holder including a first clamping member engaged by the other leg and having a first clamping surface with an elongated opening therein, the first clamping surface supporting the saw blade thereagainst with the aperture therein overlying the opening, a second clamping member shiftably mounted on the first clamping member and having a second clamping surface for cooperation with the first clamping surface to hold the saw blade therebetween with a finger on the second clamping surface extending therefrom, movement of the finger toward the one leg camming the first and the second clamping surfaces toward each other and against the associated saw blade, the second clamping member being movable between a saw blade receiving position wherein the second clamping surface and the finger are disposed away from the first clamping surface a distance sufficient to receive the saw blade therebetween and a saw blade clamping position wherein the one end of the saw blade is clamped between the clamping surfaces and the finger extends through the aperture and into the opening firmly to clamp the saw blade therebetween, whereby operation of the tensioning means to tension the saw blade moves the finger and cams the clamping members to the clamping positions thereof with the saw blade firmly clamped therebetween.

Another object of the present invention is to provide a handsaw of the type set forth in which the second clamping member is rotatably mounted on the first clamping member and is rotatable to cam the second clamping member to the saw blade clamping positions thereof.

A further object of the present invention is to provide a handsaw of the type set forth in which the second clamping member is shiftably mounted on the first clamping member and is slidable with respect thereto for movement between the saw blade receiving position thereof and the saw blade clamping position thereof wherein the saw blade is wedged between the clamping members.

The invention, both as to its organization and method of operation, together with further objects and advantages thereof, will best be understood by reference to the following specification considered in connection with the accompanying drawings, in which:

FIG. 1 is an elevational side view of a handsaw embodying the principles of the present invention, wherein the saw blade is tensioned and ready for use;

FIG. 2 is an enlarged elevational side view of the left-hand portion of the saw blade and frame of the handsaw illustrated in FIG. 1 particularly illustrating the blade holder of the present invention;

FIG. 3 is an end elevational view of the handsaw illustrated in FIG. 2 taken along the line 3—3 thereof;

FIG. 4 is an enlarged elevational side view of the portion of the handsaw illustrated in FIG. 2 with the saw blade rotated 90° with respect to the position shown in FIG. 2;

FIG. 5 is an elevational end view of the blade holder and handsaw construction illustrated in FIG. 4 without the saw blade therein;

FIG. 6 is an elevational view partly in cross section of the left-hand portion of the handsaw illustrated in FIG. 4 showing the blade holder in the saw blade clamping position thereof;

FIG. 7 is an elevational view partly in cross section of the blade holder shown in FIG. 4 with the blade holder in the saw blade receiving position thereof;

FIG. 8 is an enlarged elevational side view of the left-hand portion of the handsaw illustrated in FIG. 1 showing another embodiment of the blade holder of the present invention;

FIG. 9 is an elevational side view of the handsaw shown in FIG. 8 with the saw blade and blade holder rotated 90° with respect to the position illustrated in FIG. 8;

FIG. 10 is an elevational end view of the saw blade holder shown in FIG. 9 without the saw blade therein;

FIG. 11 is an elevational view partly in cross section of the saw blade holder illustrated in FIG. 9 showing the second clamping member in the saw blade clamping position thereof; and FIG. 12 is an elevational view partly in cross section of the blade holder shown in FIG. 9 showing the second clamping member in the saw blade receiving position thereof.

Referring now to FIG. 1 of the drawings, there is illustrated a handsaw 100 including a saw frame 105 having a handle 110 at the rear end of the handsaw 100, the handle 110 including a grip portion 111 having a web 112 bounded on either side thereof by laterally extending flanges 113. The handle 110 has at the forward end thereof a cylindrical boss 114 into which fits one end of a tubular frame member 116, the other end of the tubular member 116 fitting into a cylindrical boss 118 of a front frame member 117. The saw frame 105 further includes a front leg 119 extending in the same direction from the tubular frame member 116 as the handle 110.

As may be seen from FIGS. 2 and 3 particularly, the distal end of the leg 119 is formed into a retaining member 125 having a front face 126 and a rear face 127. The front face 126 of the retaining member 125 has a bevelled portion 128 which is annular in shape, the peripheral surface of the retaining member 125 being denoted by the numeral 129. The front face 126 of the retaining member 125 has therein four grooves each 90° from the other, the two grooves in the horizontal plane of FIG. 3 being denoted by the numeral 131 and two grooves in the vertical plane of FIG. 3 being denoted by the numeral 132, the grooves 131 and 132 being for a purpose hereinafter to be explained. The retaining member 125 further has a cylindrical aperture 134 extending from the front face 126 to the rear face 127, all for a purpose hereinafter set out.

Turning now to FIG. 1, there is disposed on the handle 110 and particularly on the boss 114 a rear leg 140 extending downwardly from the boss 114 in the same direction as the handle 110 and the front leg 119. At the distal end of the rear leg 140 away from the boss 114 is a retaining member 150, the retaining member 150 being cylindrical in shape and having a square aperture 151 extending therethrough. A saw blade 155 for use with the hand saw construction 100 has an aperture in each end thereof and is positioned in use between a blade holder 160 and a blade holder 160A, the blade holders 160 and 160A being substantially identical in construction except as hereinafter set forth. The principal difference between the blade holder 160 and the blade holder 160A is in the shaft 165A extending from the blade holder 160A, which shaft 165A has a square portion 165A adapted to fit within the square aperture 151 in the retaining member 150. The shaft 155 further includes a round portion 157 extending outwardly from the square portion 156 and which is threaded to receive a wing nut 158, all for a purpose hereinafter set forth.

Referring now to FIGS. 2–5, there is disclosed in detail the blade holder 160 commonly known in the art as a stretcher, which blade holder 160 includes a first clamping member 165 having two spaced apart generally parallel side walls 166 and 167 interconnected by an upstanding end wall 168 and a substantially flat first clamping surface or bottom wall 169. The first clamping surface 169 or bottom wall has therein an elongated opening 170 in the form of an oval groove, as best seen in FIG. 2. The outer periphery of the first clamping member 165 is completed by two slanting bottom side walls 172 and 173 interconnected by a central connecting wall 174. As may be seen, therefore, the first clamping member 165 is channel-shaped with the first clamping surface 169 being the bight portion of the channel. There is also provided a cylindrical shaft 180 fixedly connected to the end wall 168 of the first clamping member 165, the cylindrical shaft 180 extending outwardly from the end wall 168 and having a hole 181 bored transversely therethrough, as best seen in FIG. 4, to receive therein a pin 182, for a purpose hereinafter to be explained.

There is also provided a second clamping member 185 mounted on the first clamping member 165, the second clamping member 185 including a rotatable member 186, which member 186 is tear-dropped in transverse cross section and is mounted on the first clamping member 165 for pivotal movement with respect thereto by means of a shaft 188 extending outwardly from the rotatable member 186, the shaft 188 being eccentrically mounted on the sides of the member 186. The second clamping member 185 has a finger 190 extending outwardly from a second clamping surface 191, the second clamping surface 191 being substantially flat, for a purpose hereinafter to be explained. There is also provided a plurality of serrations to form a knurled portion 192 on the outer peripheral surface of the second clamping member 185 which knurled portion 192 extends through an arcuate angle of about 160°, the exact angular extent not being critical.

As may be seen from FIGS. 2 and 3, the first clamping member 165 is mounted within the retaining member 125 of the front leg 119 and is rotatable with respect thereto. The groves 131 and 132 cooperating with the pin 182 to act as detents so as to enable the saw blade 155 to be positioned in any one of four positions in use, particularly refer to FIG. 3.

Referring to FIGS. 6 and 7, there are shown the two positions of the blade holder 160, FIG. 6 showing the blade holder 160 in the saw blade clamping position thereof and FIG. 7 showing the blade holder 160 in the saw blade receiving position thereof. More particularly, the second clamping member 185 is in the saw blade clamping position thereof when the second clamping surface 191 is disposed against one side of the blade 155 and the finger 191 extends through a hole in the blade into the opening 170 in the first clamping member 165. In the configuration shown in FIG. 6, the blade 155 is firmly contacted on one side thereof by the second clamping surface 191 and on the other side thereof by the first clamping surface 169 of the clamping member 165. It will be noted that the finger 190 in the blade clamping position thereof extends through the hole in the blade 155 and into the opening 170 but is spaced from the front wall of the opening 170. The blade 155 is maintained between the first clamping member 165 and the second clamping member 185 by means of tension applied to the blade by operation of the wing nut 158 and shaft 165A wherein the wing nut 158 is tightened so as to draw the blade holder 160A to the right, as shown in FIG. 1, thereby to tension the blade 155 and to maintain the blade holder 160 in the blade clamping position thereof.

Referring now to FIG. 7, the blade holder 160 is shown in the saw blade receiving position thereof wherein the finger 190 and the first clamping surface 191 are disposed away from the first clamping surface 169. Movement of the second clamping member 165 from the saw blade clamping position thereof to the saw blade receiving position thereof is effected by providing friction against the knurled portion 192 of the second clamping member 185 and rotating the same in a counterclockwise direction as shown by the arrow on the figure. Since the shaft 188 is mounted eccentrically of the rotatable member 186, the outer peripheral wall of the member 186 adjacent to the knurled portion 192 cams away from the first clamping surface 169 during rotation of the member 186 from the saw blade clamping position thereof to the saw blade receiving position thereof, thereby allowing insertion of the saw blade 155 between the second clamping member 185 and the first clamping surface 169 of the first clamping member 165.

As previously stated, the tension in the blade 155 serves to maintain the clamping members 165 and 185 in the blade clamping position thereof, whereby it is necessary to relieve the tension in the blade 155 before the clamping member 185 can be moved from the saw blade clamping position thereof to the saw blade removing position thereof. Removing the tension in the blade 155 is accomplished by releasing the wing nut 158 by rotating the same with respect to the shaft 155 and particularly the threaded portion 157 thereof thereby to release the tension in the blade 155 and to permit movement of the second clamping member 185 from the saw blade clamping position thereof, wherein the clamping surface 191 and the clamping surface 169 are disposed on the opposite sides of and in contact with the blade 155 and the finger 190 is disposed through the aperture in the blade 155 and into the opening 170, to the saw blade receiving position thereof, wherein the clamping surface 191 and finger 190 are disposed away from the first clamping surface 169, thereby to permit insertion or removal of the blade from the blade holder 160.

As may be seen, it is important that the first clamping surface 169 and the second clamping surface 191 be spaced apart a distance sufficient to receive a saw blade therebetween when the second clamping member 185 is in the saw blade clamping position thereof. Further, it is important that the finger 190 remain out of contact with the front wall of the opening 170 until the clamping surfaces 169 and 171 are substantially parallel one to the other and are in contact with both sides of the saw blade 155. Premature contact by the finger 190 with any of the surfaces forming the opening 170 will prevent the second clamping member 185 from reaching the proper saw blade clamping position thereof, thereby resulting in an insecure clamping of the saw blade 155 between the clamping member 185 and the clamping member 165. Since the opening 170 is in the form of an oval groove, there is sufficient surface area available in the first clamping surface 169 firmly to contact the one side of the blade 155 thereby to trap it against the second clamping surface 191 when the second clamping member 185 is in the saw blade clamping position thereof.

There is illustrated in FIGS. 8–12 a second embodiment of the present invention wherein a blade holder 260 is shown connected to the leg 119 of the handsaw frame 105. The blade holder 260 includes a first clamping member 265 having a first side wall 266 and a second side wall 267 spaced apart and generally parallel one to the other and connected by an end wall 268, it being noted that the side walls 266 and 267 extend higher in the blade holder 260 than in the blade holder 160. The first clamping member 265 further includes a first clamping surface or bottom 269 interconnecting the side walls 266 and 267, which first clamping surface 269 is provided with an opening 270 therein in the form of an elongated oval groove. Referring to FIG. 10, it is seen that the outer periphery of the first clamping member 265 includes two slanted bottom side walls 272 and 273 interconnected by a flat connecting wall 274. It is seen that the first clamping member 265 is in the form of a channel wherein the first clamping surface 269 forms the bight between the two side walls 266 and 267. Each of the side walls 266 and 267 has positioned therein an elongated track 275 and 276 respectively, the tracks 275 and 276 being in the form of slots and being positioned at an angle with respect to the surface 269, for a purpose hereinafter to be explained.

The first clamping member 265 of the blade holder 260 has connected thereto a cylindrical shaft 280 which extends outwardly from the end wall 268, the cylindrical shaft 280 having a transverse hole 281 therethrough which receives a pin 282. The cylindrical shaft 280 serves the same purpose as the shaft 180, whereby the pin 282 cooperates with the grooves 231 and 232 so as to enable the blade 155 to be positioned in one of four positions, each of which being 90° with respect to the other.

The blade holder 260 further includes a second clamping member 285 mounted on the first clamping member 265 for shiftable movement therewith. The second clamping member 285 includes a hemicylindrical rotatable member 286 having a shaft 288 extending from both sides thereof and positioned within the respective ones of the tracks 275 and 276. The second clamping member 285 further includes a finger 290 extending outwardly from the second clamping surface 291 which is also the bottom wall of the member 286. The second clamping member 285 further includes a plurality of serrations to form a knurled portion 292 on the outer periphery of the hemicylindrical rotatable member 286, the knurled portion 292 covering an arc of about 160°, and serving the same purpose as the knurled portion 192 on the second clamping member 185.

The blade holder 260, like the blade holder 160, is movable between a blade clamping position in which the first clamping surface 269 and the second clamping surface 291 are disposed in contact with and on opposite sides of the blade 155 with the finger 290 of the second clamping member 285 extending through an aperture in the blade 155 and into the opening 270 in the first clamping surface 269, the finger 290 being spaced away from the front end of the opening 270. Similarly, the blade holder 260 is movable to a blade releasing position wherein the second clamping member 285 is shiftably moved so that the second clamping surface 291 and the finger 290 are disposed away from the first clamping surface 269 a distance sufficient to permit the insertion therebetween of a blade 155.

As seen in FIG. 11, the blade holder 260 is in the blade clamping position thereof wherein the second clamping member 285 is disposed with the second clamping surface 291 parallel to the first clamping surface 269 and spaced apart a distance sufficient to permit the blade 155 to rest therebetween, the shaft 288 being positioned near the lower end of the respective tracks 275 and 276. Further, the finger 290 is positioned through an aperture in the blade 155 and into the opening 270 in the first clamping surface 269 of the first clamping member 265. It is noted that the finger 290 is spaced apart from the front end of the opening 270 so as to permit the blade holder 260 to remain in the blade clamping position thereof once the blade 155 has been tensioned all as hereinbefore set forth.

Referring to FIG. 12, there is shown the blade holder 260 in the blade releasing position thereof, wherein the second clamping member 285 is shown in phantom. The solid line figure of the second clamping member 285 shows the position of the second clamping member 285 with respect to the first clamping member 265 when the second clamping member 285 has been moved to the far upper end of the grooves 276, the movement being effected by applying pressure to the knurled portion 292 of the second clamping member 285. Once the second clamping member 285 is in the full line position, as shown in FIG. 12, it may be rotated angularly with respect to the first clamping member 265 to assume the position shown in phantom, wherein the second clamping surface 291 and the finger 290 are spaced from the first clamping surface 269 a distance sufficient to permit the insertion and removal of the blade 155 between the clamping member 285 and the clamping member 265.

It is clear, therefore, that the second clamping member 285 is shiftable with respect to the first clamping member 265 between the blade holding condition thereof, wherein the second clamping surface 291 is disposed parallel to the first clamping surface 269 and at a distance sufficient so that the clamping surfaces 291 and 269 contact opposite sides of the blade 155 disposed therebetween, and a blade releasing position, wherein the second clamping surface 291 and the finger 290 are disposed away from the first clamping surface 269 a distance sufficient to permit the insertion therebetween and removal therefrom of a blade 155. The blade holder 260 differs from the blade holder 160 in that the second clamping member 285 is both slidable and rotatable and serves to maintain the blade 155 in the blade clamping position by means of a wedging action of the second clamping surface 291 against the blade 155 and against the first clamping surface 269.

Operation of the handsaw 100 utilizing the blade holder 260 is the same as the operation of the handsaw 100 using the blade holder 160, both blade holders 160 and 260 being maintained in the blade holding condition thereof by means of tension put on the blade 155 by operation of the wing nut 158 with respect to the threaded shaft 157 and both blade holders 160 and 260 being movable to the blade releasing position thereof by initially releasing the tension in the blade 155 so as to permit movement of the second clamping member of the blade holder to its blade releasing position thereof.

It is clear from the foregoing that the blade holder 160 may be mounted on either the front leg 115 or the rear leg 140, it being a matter of preference that the blade holder 160 is mounted as disclosed in the figure. If it is desired to reverse the position of the blade holders 160 and 160A, the retaining member 150 is provided with a plurality of grooves such as grooves 131 and 132 provided in the retaining member 125.

It will be observed that there has been provided an improved handsaw having a blade holder including first and second clamping means carrying respectively first and second clamping surfaces embodying all the objects and advantages set forth herein. While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A handsaw for holding a saw blade having an aperture in one end thereof, the handsaw comprising a longitudinally extending saw frame including a handle at the rear end thereof and a front leg at the front end thereof and a rear leg intermediate said front leg and said handle, tensioning means on at least one of said legs for securing thereto the other end of the saw blade and a blade holder on the other of said legs for securing thereto the one end of the saw blade, said blade holder including a first clamping member engaged by said other leg and having opposed tracks in the sides thereof and having a first clamping surface with an elongated opening therein, said first clamping surface supporting the saw blade thereagainst with the aperture therein overlying said opening, a second clamping member slidably mounted in said tracks and having a second clamping surface for cooperation with said first clamping surface to hold the saw blade therebetween with a finger on said second clamping surface extending therefrom, movement of said finger toward said one leg camming said first and said second clamping surfaces toward each other and against the associated saw blade, said second clamping member being slidable between a saw blade receiving position wherein said second clamping surface and said finger are disposed away from said first clamping surface a distance sufficient to receive the saw blade therebetween and a saw blade clamping position wherein the one end of the saw blade is wedged between said clamping surfaces and said finger extends through the aperture and into said opening firmly to clamp the saw blade therebetween, whereby operation of said tensioning means to tension the saw blade moves said finger and cams said clamping members to the clamping positions thereof with the saw blade firmly wedged therebetween.

2. The handsaw set forth in claim 1, wherein said tracks are angularly disposed with respect to said first clamping surface.

3. The handsaw set forth in claim 1, wherein said tracks are slots extending through the sides of said first clamping member.

4. The handsaw set forth in claim 1, wherein said second clamping member is slidable and rotatable with respect to said first clamping member.

* * * * *